2,894,345
Patented July 14, 1959

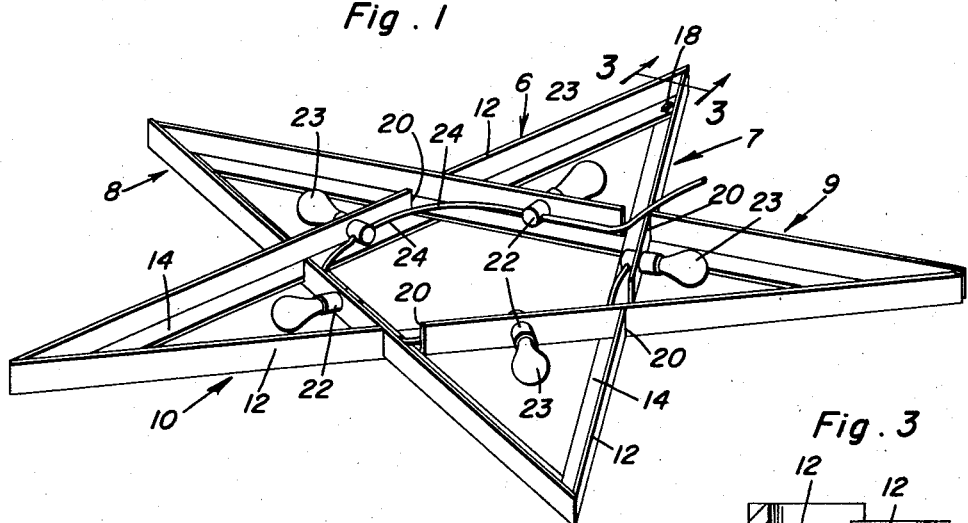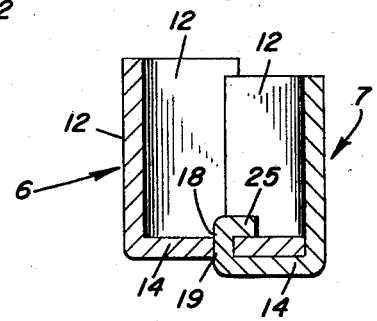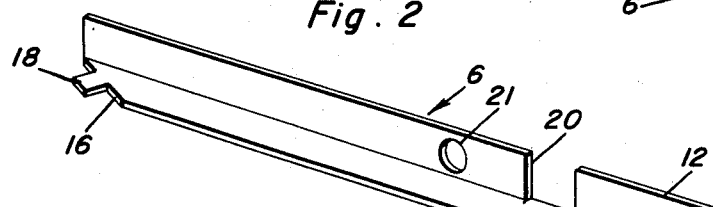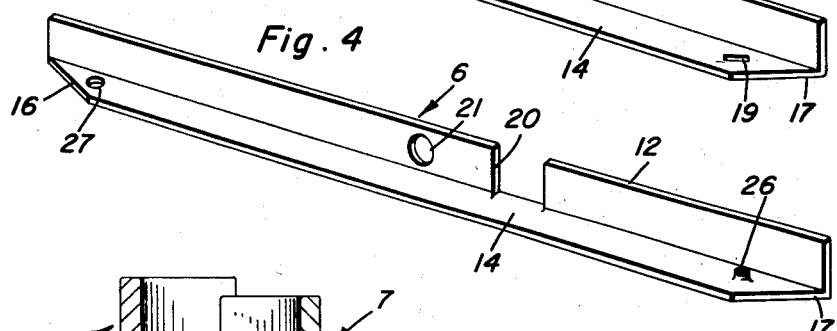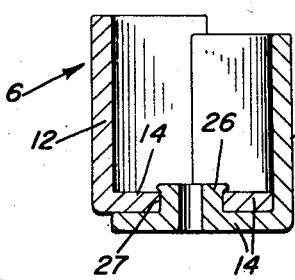

2,894,345
DECORATIVE STAR

William L. Bushnell, Roselle, N.J.

Application July 30, 1956, Serial No. 600,736

3 Claims. (Cl. 41—10)

The present invention relates to an illuminable open-type framework which is equipped to support a plurality of attractively arranged lamp bulbs and which is unique and ornamental in appearance, is preferably designed, marginally and otherwise, to represent a star and, considered as a structural entity, is a novel contribution to the art to which it relates.

Ornamental devices which are electro-mechanical in form usually symbolize well known objects. When used during the Christmas and Easter seasons and on numerous festive and memorial occasions, five and six-pointed stars are not only outstandingly popular but are in keeping with the spirit of almost any occasion. It follows that the concept herein under advisement pertains to a framework supporting symmetrically arranged light bulbs or lamps, one which is preferably star-shaped and is novel in that the members or elements thereof are identical in construction, are easy to put together and therefore make for a novel contribution to the art.

More specifically, the invention in its preferred embodiment has to do with a star-shaped framework wherein each frame member is an elongate channel line of requisite length and cross-section and of suitable material and wherein by notching intermediate portions thereof, one may readily arrange and put the members together in a so-called easy-to-erect manner.

Other objects, features and advantages will become more readily apparent from the following description and the accompanying sheet of illustrative, but not necessarily restrictive, drawings.

In the accompanying sheet of drawings, and wherein like numerals are employed to designate like parts throughout the views:

Fig. 1 is a perspective view of the improved star-like openwork frame showing its construction and how it looks when it is complete and ready for use;

Fig. 2 is a perspective view of one of the aforementioned angle-type frame members;

Fig. 3 is an exaggerated detail section on the line 3—3 of Fig. 1 looking in the direction of the arrows;

Fig. 4 is a perspective view similar to Fig. 2 showing a slight modification in construction; and Fig. 5 is a cross-section like Fig. 3 showing how the modification differs from that depicted in Fig. 3.

Referring now to the drawings and as has already been said, a five-pointed star is shown and is made up of five identical frame members which can be made up in practically any size and which may be constructed from metal, plastic or wood. While the article depicted in the drawings might be said to be intended for use, let us say, as a Christmas tree top ornament, it may be made larger and of suitable materials for outdoor use where evergreens are trimmed and dressed for the holiday season. It is within the purview of the invention, however, to construct any "star" which is small enough to be an earring. The principle of construction would be the same.

In the star-shaped frame construction shown in Fig. 1 five frame members are employed. Each is identical and each is in the form of a so-called angle iron. For convenience, the angle irons are individually identified as 6, 7, 8, 9 and 10, respectively. As before mentioned, each angle iron being identical with the other reference is had to Fig. 2 wherein it will be seen that the vertical flange is denoted at 12 and the horizontal flange at 14. The end portions of the horizontal flange 14 are obliquely cut or may be said to be mitered as at 16 and 17, respectively. The end portion 16 is provided with an outstanding bendable locking tongue 18 while there is a keeper slot 19 at the end portion 14. The intermediate portion of the vertical flange is provided with a clearance and accommodation notch 20 and adjacent thereto with a hole 21 which latter serves to accommodate a socket member 22 carrying a screw-type conventional electric lamp or bulb 23. In practice the respective bulbs, which are circumferentially arranged and spaced apart, are electrically interconnected by suitable wiring means or wires 24. The outer adjacent end portions of the respective angle irons are placed in abutting relationship and the adjacent portions of the horizontal flanges overlap so that the underlying tongue-equipped flange permits the tongue to be passed up through the keeper hole 19 and then bent over and secured in place, for example, as at 25 in Fig. 3. All of the respective five points or pointed end portions are connected in this manner. This means that the intermediate notched portions of the respective angle irons are such that they permit the non-notched portions of the cooperating angle iron to be seated and connected in the manner best shown in Fig. 1. For example, the angle iron 9 is engaged in the notched intermediate portion of the first-named angle iron 6 and the notched portion of the angle iron 9 provides a passageway and seat for the intermediate non-notched portion of the angle iron 7, and so on. The frame structure is not only ornamental because of its star-shaped appearance but because of the fact that the angle irons may be illuminated by way of the lamp bulbs thus providing a hub-like lighting source at the center of the star. Where the angle members are made of metal the surfaces may be polished and made reflective to reflect light rays from the bulbs. Where commercial plastics are employed various color schemes and colorful effects may be realized. It is evident that the socket members with the bulbs are arranged in the holes 21 provided therefor in the vertical flanges 12.

The angle iron seen in Fig. 4 is substantially identical with the one seen in Fig. 2 and the only difference is that the keeper notch 19 is dispensed with and a boss of cylindrical or tubular form is provided and this is denoted by the numeral 26 and extends through a correspondingly shaped keeper hole 27 where it is then peened in place and held. Since the members are otherwise the same in construction the same numerals are employed to designate corresponding parts throughout all of the views.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A decorative illuminable star comprising an ornamental open-work frame structure characterized by a plurality of companion interconnected V-shaped components made up of a plurality of paired and assembled frame members, said frame members being each of the same construction and having intermediate portions thereof crossed and connected together in cooperating relationship and adjacent cooperating outer end portions abutting and connected together, each frame member comprising an angle iron having a horizontal flange and a vertical flange, the respective ends of said horizontal flange being mitered, said horizontal flange being provided at one mitered end with a detent and being provided inwardly of its other mitered end with a keeper hole, the cooperating detent and keeper holes functioning to connect said outer ends with each other, the vertical flange of each angle iron having a notch therein seating and permitting passage therethrough of the cooperating non-notched portion of the adjacent cooperating vertical and horizontal flanges, said notches being at the points where the frame members are crossed and overlap each other.

2. The structure defined in claim 1 and wherein a median portion of each vertical flange is provided adjacent to a notch in said flange with an opening, said opening being adapted to accommodate an insertable and removable base on a conventional type lamp bulb.

3. A decorative star usable as an ornament during festive and holiday seasons comprising an open framework having complemental V-shaped portions each portion embodying duplicate angle irons, each angle iron having mitered outer ends and cooperating means whereby cooperating abutting mitered portions are connected together by detents joined with associated keeper holes, median portions of the vertical flanges of the angle iron being provided with notches through which horizontal and vertical flanges of adjacent cooperating angle irons are fast with the cooperating portions crossed and overlapped.

References Cited in the file of this patent

UNITED STATES PATENTS

| | | |
|---|---|---|
| 916,243 | Wing | Mar. 23, 1909 |
| 1,614,958 | Hornby | Jan. 18, 1927 |
| 1,689,164 | Sylvester | Oct. 23, 1928 |
| 2,112,247 | McLoughlin | Mar. 29, 1938 |
| 2,591,346 | Fitzgerald | Apr. 1, 1952 |

FOREIGN PATENTS

| | | |
|---|---|---|
| 144,765 | Great Britain | June 14, 1920 |